US 6,728,431 B2

(12) United States Patent
Ames et al.

(10) Patent No.: US 6,728,431 B2
(45) Date of Patent: Apr. 27, 2004

(54) FIBER OPTIC CURVATURE SENSOR FOR TOWED HYDROPHONE ARRAYS

(75) Inventors: Gregory H. Ames, Wakefield, RI (US); Antonio L. Deus, III, Saunderstown, RI (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 114 days.

(21) Appl. No.: 09/983,048

(22) Filed: Oct. 15, 2001

(65) Prior Publication Data

US 2003/0072515 A1 Apr. 17, 2003

(51) Int. Cl.[7] .................................................. G02B 6/00
(52) U.S. Cl. ........................................... 385/13; 385/12
(58) Field of Search ..................... 385/13, 12; 606/130; 250/227.14, 227.16

(56) References Cited

U.S. PATENT DOCUMENTS 5,005,005 A * 4/1991 Brossia et al. .............. 340/604
5,363,342 A * 11/1994 Layton et al. ............... 367/149
5,633,494 A * 5/1997 Danisch .................. 250/227.16
6,047,094 A * 4/2000 Kalamkarov et al. ......... 385/12
6,108,473 A * 8/2000 Beland et al. ............... 385/113
6,127,672 A * 10/2000 Danisch .................. 250/227.14
6,278,811 B1 * 8/2001 Hay et al. .................... 385/13
6,471,710 B1 * 10/2002 Bucholtz .................... 606/130

* cited by examiner

Primary Examiner—Ellen E. Kim
(74) Attorney, Agent, or Firm—James M. Kasischke; Michael F. Oglo; Jean-Paul A. Nasser

(57) ABSTRACT

The present invention relates to a system for sensing the curvature of a towed hydrophone array and a curvature sensor used in the system. The system has at least two curvature sensors positioned along the length of the array. Each of the curvature sensors comprises a bend member which bends as the array bends, at least one optical fiber within the bend member, and at least one detection device embedded within the at least one optical fiber to detect a change in the strain in the at least one optical fiber.

33 Claims, 3 Drawing Sheets

FIBER OPTIC CURVATURE SENSOR FOR TOWED HYDROPHONE ARRAYS

CROSS REFERENCE TO OTHER PATENT APPLICATIONS

This patent application is co-pending with two related patent applications entitled FIBER OPTIC PITCH OR ROLL SENSOR Ser. No. 09/983,047, and MULTIPLEXED FIBER LASER SENSOR SYSTEM Ser. No. 09/983,046, by the same inventors as this application.

STATEMENT OF GOVERNMENT INTEREST

The invention described herein may be manufactured and used by or for the Government of the United States of America for governmental purposes without the payment of royalties thereon or therefore.

BACKGROUND OF THE INVENTION (1) Field of the Invention

The invention relates to a device and method for sensing the curvature of a towed array. The device of the present invention, in combination with other sensors, may be used to determine the shape of a towed hydrophone array.

(2) Description of the Prior Art

Optical fibers have been used in a variety of sensors. For example, U.S. Pat. Nos. 4,654,520; 4,812,645; and 4,927,232, all to Griffiths, illustrate structural monitoring systems which have an optical fiber securely and continuously fastened to a structure such as a pipeline, offshore platform, bridge, building, or a dam or to a natural object. A light signal is passed into one end of the optical fiber. Any physical movement of the structure, or sectional movements along the optical fiber path, such as deflection, bending, displacement, or fracture of the structure affects the optical fiber. As a consequence, detectable changes occur in the electro-optical signature or in the light signal transmission.

U.S. Pat. No. 5,321,257 to Danisch illustrates a fiber optic bending and positioning sensor which is composed of a fiber optic or light wave guide for attachment to the member which is to be bent or displaced. Light is injected at one end and detected at the other end. Bending of the fiber results in light loss through a surface strip or band, along one side of the fiber, this loss being detected. The loss of light detection is used to produce indication of bending or displacement. Two or more light guides can be oriented to give indication of the direction of bending or displacement.

One of the deficiencies of these systems however is that the optical fiber(s) used in the sensor is/are attached directly to the structure whose behavior is being observed.

Some towed hydrophone arrays require precise determination of their shape in the water. This has been done in the past with gimbaled heading sensors. Such sensors are quite expensive. They are unsuitable in today's environment where one needs to reduce cost in a towed array. It is also desirable in modern towed arrays to provide shape sensing that is compatible with optical hydrophones and that is relatively inexpensive to perform.

An alternative way to determine array shape is by curvature sensors and either roll or twist sensors. It has been proposed to use fiber optic sensors to sense curvature. Such sensors embed optical fibers containing Bragg gratings in the hose wall of the towed array. The Bragg gratings sense the strain in the hose wall when the array is bent and the differential strain from the outside to the inside of the bend permits calculation of the curvature. However, the strain seen in the hose wall as the array passes over small diameter handling sheaves can exceed the survival strain of an optical fiber. It has been suggested to reduce the strain seen by winding at a pitch angle, but that approach is awkward. It has also been suggested to reduce strain by minimizing the distance each fiber is placed from the centerline of the array. The disadvantage of all these mounting schemes is that while limiting the maximum strain seen, these schemes also limit the strain sensitivity achievable. One may define a total dynamic range of curvature from the maximum curvature of the handling system sheaves to the minimum curvature associated with the ultimate array position accuracy desired. This range may be 50 dB. Meanwhile, the sensor system actually only has to operate in towing conditions where the range of curvatures seen may be less than 30 dB.

Thus, there remains a need for a system which senses the curvature of a towed array as well as the shape of the towed array.

SUMMARY OF THE INVENTION

Accordingly, it is an object of the present invention to provide a sensor system which senses the curvature of a towed hydrophone array.

It is a further object of the present invention to provide a sensor system as above which can in combination with other sensors may be used to determine the shape of a towed hydrophone array.

It is yet a further object of the present invention to provide a sensor system as above which achieves high strain sensitivity while limiting the maximum strain seen by the optical fiber(s) therein so that only the operational dynamic range is required of the optical fiber(s).

The foregoing objects are attained by the curvature sensor of the present invention.

In accordance with the present invention, a curvature sensor is provided. The curvature sensor broadly comprises a bend member which bends as the array into which it is incorporated bends, at least one optical fiber within the bend member, and at least one detection device embedded within the at least one optical fiber to detect a change in strain in the at least one optical fiber.

A system for detecting the curvature in a towed hydrophone array comprises at least two of said curvature sensors positioned along the length of the array.

A system for also detecting the shape of the towed array includes a roll sensor positioned adjacent each of the curvature sensors.

Other details of the fiber optic curvature sensor of the present invention and the systems into which it can be incorporated, as well as other objects and advantages attendant thereto, are set forth in the following detailed description and the accompanying drawings wherein like reference numerals depict like elements.

DESCRIPTION OF THE PREFERRED EMBODIMENT(S)

Figure 1:
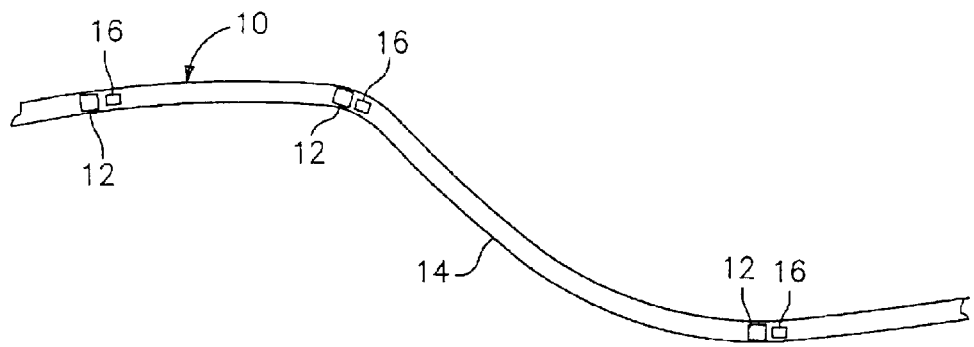
FIG. 1 is a schematic representation of a system for sensing the curvature of a towed array and the shape of the towed array.

Referring now to the drawings, FIG. 1 illustrates a system 10 for sensing the curvature and shape of a towed array. Instead of a continuous optical fiber embedded into the hose wall of the array, the system 10 has a plurality of single point curvature sensors 12 placed at various locations along the length of the towed hydrophone array 14. As depicted in FIG. 1, the curvature sensors 12 may be placed quite far apart because of the long transverse wavelengths of the tow cables under tow. As a result, the system 10 requires fewer curvature sensors 12. The system 10 further has a plurality of roll sensors 16 with each roll sensor 16 being in close proximity to each curvature sensor 12 so that the direction of curvature relative to the surrounding environment may be determined. Because the curvature sensors 12 are single point sensors, the optical fiber(s) 18 that lead to and from each curvature sensor 12 may be separated from the structure of the towed hydrophone array 14 so that the optical fiber(s) 18 do not see excessive strain as the towed hydrophone array 14 is bent over small diameter handling sheaves. The curvature sensors 12 of the present invention are shorter than the minimum rigid length requirement associated with the towed hydrophone array 14 and the handling system (not shown).

The roll sensors 16 used in the system 10 may comprise any suitable roll sensor known in the art. However, in a preferred embodiment, each roll sensor 16 comprises the motion sensor shown in copending U.S. patent application Ser. No. 09/983,047 filed Oct. 15, 2001, entitled FIBER OPTIC PITCH OR ROLL SENSOR which is incorporated by reference herein. Together with the curvature sensors 12, the roll sensors 16 may be used in a known manner to determine the shape of the towed hydrophone array 14.

Figure 2:
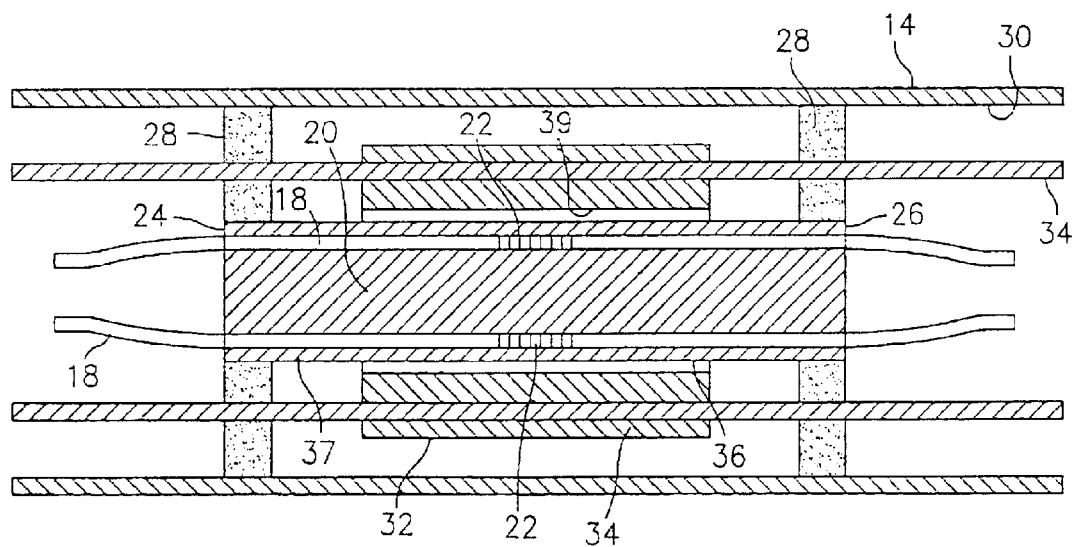
FIG. 2 is a sectional view showing a first embodiment of a curvature sensor in accordance with the present invention.

FIG. 2 illustrates a first embodiment of a curvature sensor 12 in accordance with the present invention. The curvature sensor 12 in this embodiment has a plurality of optical fibers 18, preferably three or four optical fibers 18, embedded in a bend rod 20. Each of the optical fibers 18 runs longitudinally down the length of the bend rod 20. The optical fibers 18 are radially distributed around the perimeter of the bend rod 20. The diameter of the bend rod 20 and the diameter of the optical fiber centers are determined by the strain sensing requirements.

The separation of the optical fibers 18 acts as a lever arm multiplying the strain differences seen by the optical fibers 18. When the bend rod 20 is bent, the optical fiber 18 on the inside of the bend experiences compression, while the optical fiber 18 on the outside of the bend experiences stretching. The magnitude and sign of the strain difference between the two optical fibers 18 gives the magnitude and sign of the curvature of the array 14 at the point where the curvature sensor 12 is placed.

The strain in each optical fiber 18 is preferably sensed by embedding or incorporating a detection device 22 within each of the optical fibers 18 in the bend rod 20. The detection device may be an optical fiber Bragg grating written into the core of the optical fiber 18. The changing strain in the optical fiber 18 results in a wavelength shift of the reflectivity peak of the Bragg grating 18. Such a wavelength shift may then be measured by any of a number of conventional means known in the art. The difference in wavelength shift determines the difference in the strain in a particular optical fiber 18. By comparing the outputs of the Bragg gratings embedded in the optical fibers, one can determine the curvature of the array at the location of the curvature sensor 12.

In lieu of incorporating an optical fiber Bragg grating into each optical fiber 18, an optical fiber Bragg grating laser, such as that shown in U.S. Pat. Nos. 4,761,073 and 5,513,913, which are hereby incorporated by reference, may be embedded into each optical fiber 18. Changes in the strain in a respective optical fiber 18 causes changes in the wavelength of the light emitted by the optical fiber Bragg grating laser, which changes can be measured by a number of means well known in the art. By comparing the light emitted by the lasers incorporated into the optical fibers 18, one can determine the curvature of the array 14 where the curvature sensor 12 is located.

The bend rod 20 is less than the maximum rigid length for the array 14 and its handling system (not shown). The ends 24 and 26 of the bend rod 20 may be coupled by any of a variety of means known in the art to the array structure so that the bending of the array 14 results in the bending of the bend rod 20. For example, rigid pieces 28 may be used to couple the ends 24 and 26 of the bend rod 20 to the hose wall 30 of the array 14.

The bend rod 20 is preferably placed within a mount assembly 32 which may be mounted in the array 14 by any of a number of mounting techniques with the specific mounting technique being determined by the construction of the array 14. For example, the array 14 may have internal stringers 34 and the mount assembly 32 may be mounted on the stringers 34. The inner diameter of the mount assembly 32 preferably is greater than but close to the outer diameter of the bend rod 20. The gap 36 between the outer surface 37 of the bend rod 20 and the inner surface 39 of the mount assembly 32 is selected so that, at a certain maximum curvature, the bending of the bend rod 20 is limited by the mount assembly 32 and so that the optical fibers 18 and the detection devices 22 within the bend rod 20 experience no further strain at smaller bend diameters. This maximum operational curvature is set so that each of the curvature sensors 12 will sense across the entire range of curvatures encountered during actual towing, but the maximum operational curvature is much less than the curvature seen in the handling system. This limitation allows the optical fibers 18 in the bend rod 20 to be placed further apart and still survive, leading to greater strain sensitivity for the system. This limitation also limits how far in wavelength the detection devices 22, such as the gratings or lasers, shift.

If desired, in an alternative embodiment of the present invention, a number of different detection devices 22 can be placed on each optical fiber 18. The detection devices 22 placed on each optical fiber 18 can be operated at different wavelengths if desired. With a smaller wavelength shift range, these wavelengths can be spaced more closely, allowing more detection devices per optical fiber.

Figure 3:
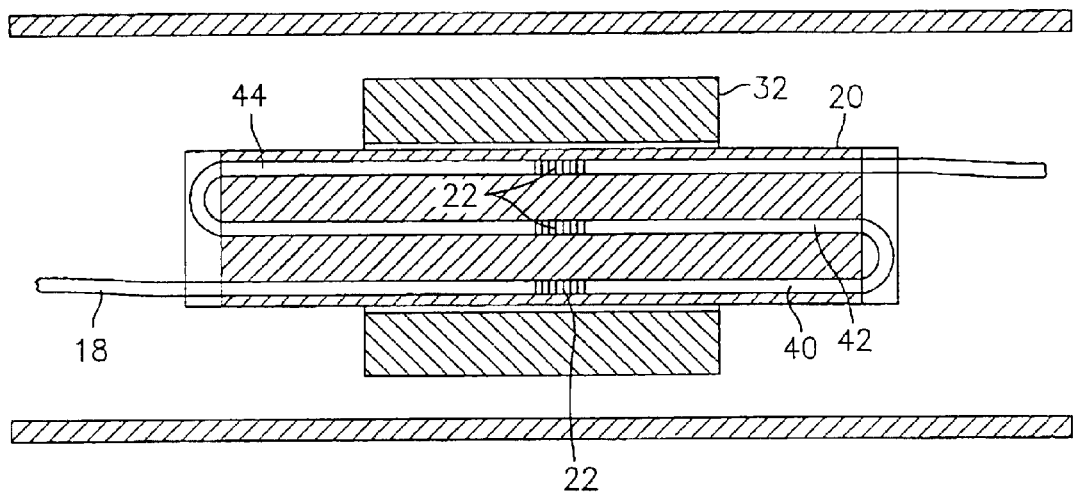
FIG. 3 is a sectional view showing a second embodiment of a curvature sensor in accordance with the present invention.

Referring now to FIG. 3, a curvature sensor 12 is shown that replaces the plurality of optical fibers 18 positioned within the bend rod 20 with a single optical fiber 18'. As can be seen in this figure, the optical fiber 18' has a serpentine configuration with legs 40, 42, and 44. Incorporated into each of the legs 40, 42, and 44 is a detection device 22. As before the detection device 22 in each leg 40, 42, and 44 can be an optical fiber Bragg grating or an optical fiber Bragg grating laser. As the array 14 is bent, the leg closest to the bend will experience compression while the leg farthest from the bend will experience an increased strain. Again, by measuring the changes in wavelengths in the detection devices 22, one can determine the change in curvature of the array 14. One of the advantages to this embodiment is that by including a plurality of detection devices 22 in a single optical fiber 18, less splices are required to connect the curvature sensor 12 into a system.

Figure 4:
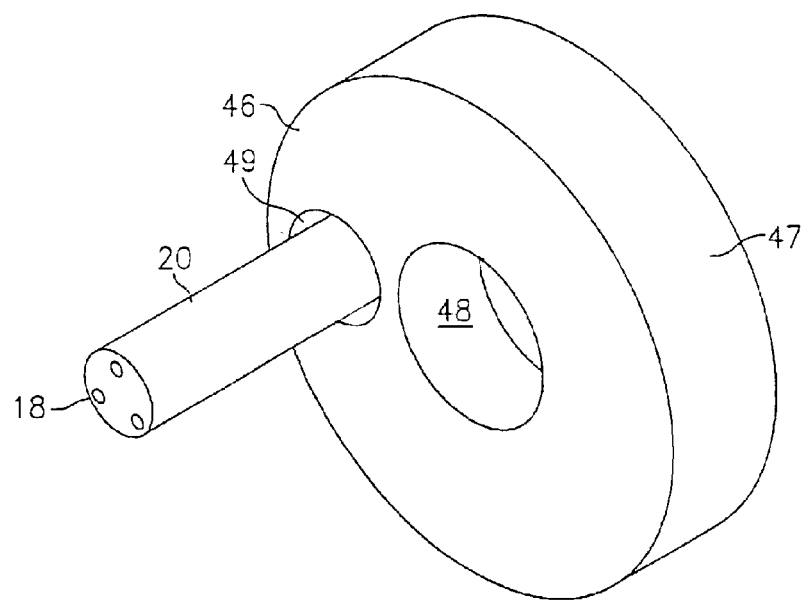
FIG. 4 is a perspective view of a third embodiment of a curvature sensor in accordance with the present invention.

FIG. 4 illustrates a modified mounting assembly 46 for a curvature sensor 12. The mounting assembly 46 is a cylindrical structure 47 designed to leave the center 48 of the array 14 free. The cylindrical structure 47 has an off axis slot 49. As can be seen from this figure, the bend rod 20 with the optical fibers 18 is positioned off axis in the slot 49. This leaves the center 48 free for some other use. This mounting assembly 46 configuration does however reduce the distance that can be achieved between the optical fibers 18 in the bend rod 20.

Figure 5:
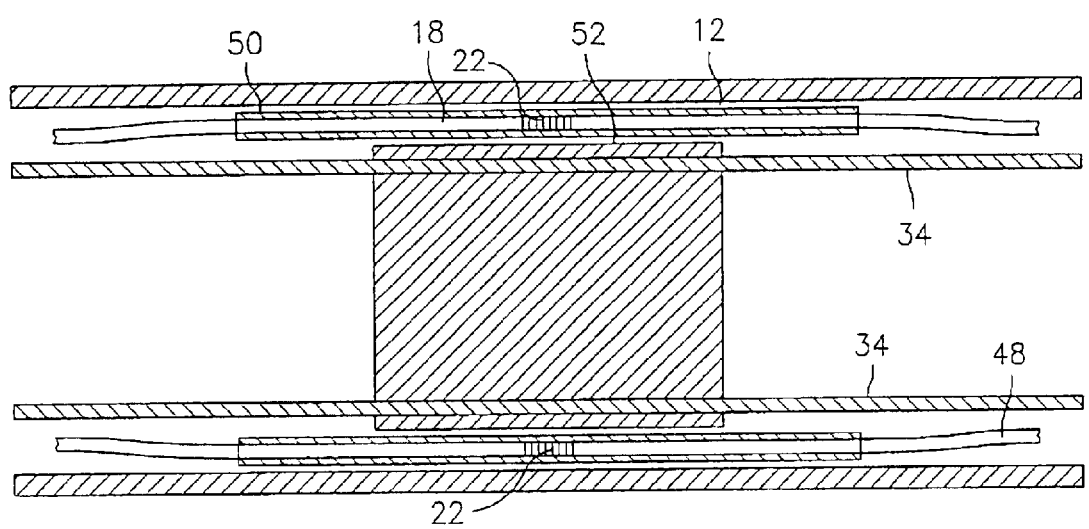
FIG. 5 is a sectional view of a fourth embodiment of a curvature sensor in accordance with the present invention.

Referring now to FIG. 5, an embodiment of a curvature sensor 12 is shown which replaces the bend rod 20 by a hollow bend cylinder 50 with embedded optical fibers 18 having embedded detecting devices 22. As before the detection devices 22 may be an optical fiber Bragg grating or an optical fiber Bragg grating laser. In this embodiment, the mount assembly 52 is located on the inside of the cylinder 50. The outer diameter of the mount assembly 52 is designed to be tight fitting to the inner diameter of the bend cylinder 50 so that the maximum bend of the optical fibers 18 is limited. This embodiment allows the optical fibers 18 with the detection devices 22 embedded therein to be placed further apart, thus giving greater curvature sensitivity in the same array diameter.

As can be seen from the foregoing discussion, the present invention provides a means for fiber optic sensing of the curvature of a towed array. The sensing means is simple and relatively inexpensive. If desired, the curvature sensor of the present invention may be multiplexed with many other such sensors on a single optical fiber.

The dynamic range of the curvature sensors 12 of the present invention is limited so that it just meets the requirements of the system. This allows the curvature sensor 12 to be designed for maximum sensitivity without risk to the fiber during small diameter bending in the handling system. This also allows different wavelength channels to be spaced more closely, leading to more curvature sensors on each optical fiber.

While the curvature sensors of the present invention have been described as having one, three or four optical fibers, it should be recognized that more than four fibers can be used in each sensor if desired.

It is apparent that there has been provided in accordance with the present invention a fiber optic curvature sensor for towed hydrophone arrays which fully satisfies the objects, means and advantages set forth hereinbefore. While the present invention has been described in the context of specific embodiments thereof, other alternatives, modifications, and variations will become apparent to those skilled in the art having read the foregoing description. Therefore, it is intended to embrace those alternatives, modifications, and variations that fall within the broad scope of the appended claims.

What is claimed is:

1. A system for detecting curvature in a towed hydrophone array, said system comprising:
   at least two curvature sensors positioned along the length of the towed hydrophone array;
   each of said curvature sensors comprising a bend member which bends as the array bends, at least one optical fiber within the bend member, and at least one detecting device embedded within said at least one optical fiber to detect a change in strain in said at least one optical fiber; and
   means for limiting the bending of said bend member and thereby the strain in said at least one optical fiber.

2. A system according to claim 1 wherein said bend member comprises a bend rod and wherein said curvature sensor has at least three optical fibers embedded within said bend rod.

3. A system according to claim 2 wherein said bend rod has a length and each of said optical fibers runs longitudinally down the length of the bend rod and wherein said optical fibers are radially distributed around the perimeter of the bend rod.

4. A system according to claim 2 wherein said at least one detection device comprises at least one optical fiber Bragg grating embedded in each of said optical fibers.

5. A system according to claim 2 wherein said at least one detection device comprises more than one optical fiber Bragg grating embedded in each of said optical fibers.

6. A system according to claim 5 wherein each of said optical fiber Bragg gratings operates at a different wavelength.

7. A system according to claim 2 wherein said at least one detection device comprises at least one optical fiber Bragg grating laser embedded within each of said optical fibers.

8. A system according to claim 2 wherein said at least one detection device comprises more than one optical fiber Bragg grating laser embedded within each of said optical fibers.

9. A system according to claim 8 wherein each of said optical fiber Bragg grating lasers operates at a different wavelength.

10. A system according to claim 2 wherein said array has a hose wall and further comprising means for coupling first and second ends of said bend rod to said hose wall.

11. A system according to claim 2 wherein said bend rod is placed within a mount assembly.

12. A system according to claim 1 wherein said bend member comprises a bend rod and said at least one optical fiber comprises a single optical fiber within said bend rod.

13. A system according to claim 12 wherein said detection device comprises an optical fiber Bragg grating.

14. A system according to claim 12 wherein said detection device comprises an optical fiber Bragg grating laser.

15. A system according to claim 14 wherein said at least one detection device comprises an optical fiber Bragg grating embedded within each said optical fiber.

16. A system according to claim 14 wherein said at least one detection device comprises an optical fiber Bragg grating laser embedded within each said optical fiber.

17. A system according to claim 1 wherein said bend member comprises a bend cylinder having a plurality of optical fibers embedded therein.

18. A system for detecting curvature in a towed hydrophone array, said system comprising:
   at least two curvature sensors positioned along the length of the towed hydrophone array;
   each of said curvature sensors comprising a bend member which bends as the array bends at least one optical fiber within the bend member, and at least one detection device embedded within said at least one optical fiber to detect a change in strain in said at least one optical fiber;

means for limiting the bending of said bend member and thereby limit the strain in said at least one optical fiber;

said bend member comprising a bend rod and said curvature sensor having at least three optical fibers embedded within said bend rod;

said array having a hose wall and means for coupling said first and second ends of said bend rod to said hose wall; and said coupling means comprising a pair of rigid pieces.

19. A system according to claim 18 wherein said mount assembly comprises a cylindrical structure having a free center and an off axis slot for receiving said bend rod.

20. A system according to claim 18 further comprising said mounting assembly being mounted within the array by a plurality of internal stringers.

21. A system according to claim 18 wherein said limiting means comprises a gap between an outer surface of said bend rod and inner surface of said mount assembly and said gap being selected so that at a certain maximum curvature the bending of the bend rod is limited by the mount assembly and so that the optical fibers and the detection devices experience no further strain at smaller bend diameters.

22. A system according to claim 21 said wherein said single optical fiber has a serpentine configuration with a plurality of legs and wherein each of said legs has a detection device embedded within said leg.

23. A system for detecting curvature in a towed hydrophone array, said system comprising:

at least two curvature sensors positioned along the length of the towed hydrophone array;

each of said curvature sensors comprising a bend member which bends as the array bends at least one optical fiber within the bend member, and at least one detection device embedded within said at least one optical fiber to detect a change in strain in said at least one optical fiber;

means for limiting the bending of said bend member and thereby limit the strain in said at least one optical fiber;

said bend member comprising a bend cylinder having a plurality of optical fibers embedded therein; and said limiting means comprising a mount assembly inside said bend cylinder; a gap between an inner surface of said bend cylinder and an outer surface of said mount assembly; and said gap being sized to limit the bending of said optical fibers.

24. A curvature sensor comprising:

a bend member;

at least one optical fiber within the bend member;

at least one detection device embedded within said at least one optical fiber to detect a change in strain in said at least one optical fiber; and means for limiting the bending of said bend member and thereby the strain in said at least one optical fiber.

25. A curvature sensor according to claim 24 wherein said at least one detection device comprises an optical fiber Bragg grating.

26. A curvature sensor according to claim 24 wherein said at least one detection device comprises an optical fiber Bragg grating laser.

27. A curvature sensor according to claim 24 wherein each said optical fiber has a plurality of detection devices embedded therein.

28. A curvature sensor according to claim 27 wherein each of said detection devices operates at a different wavelength.

29. A curvature sensor according to claim 24 wherein each said optical fiber has a plurality of detection devices embedded therein.

30. A curvature sensor according to claim 24 wherein said bend member comprises a bend rod and wherein said curvature sensor has at least three optical fibers embedded within said bend rod.

31. A curvature sensor according to claim 24 wherein said bend member comprises a bend cylinder and wherein said curvature sensor has a plurality of optical fibers embedded within said bend cylinder.

32. A curvature sensor comprising:

a bend member;

at least one optical fiber within the bend member;

at least one detection device embedded within said at least one optical fiber to detect a change in strain in said at least one optical fiber;

means for limiting the bending of said bend member and thereby the strain in said at least one optical fiber;

said bend member comprising a bend rod and said curvature sensor having at least three optical fibers embedded within said bend rod; and said bend rod having a length and each of said optical fibers running longitudinally down the length of the bend rod and said optical fibers being radially distributed around the perimeter of the bend rod.

33. A system for determining the curvature and shape of a towed hydrophone array comprising:

a plurality of curvature sensors positioned along the length of the towed hydrophone array;

each of said curvature sensors comprising a bend member which bends as the array bends, at least one optical fiber within the bend member, at least one detection device embedded within said at least one optical fiber to detect a change in strain in said at least one optical fiber, and means for limiting the bending of said bend member and thereby the strain in said at least one optical fiber; and a plurality of roll sensors positioned along the length of the towed hydrophone array with each of said roll sensors being in close proximity to a respective one of said curvature sensors.

* * * * *